United States Patent
Lawson et al.

(10) Patent No.: US 9,507,113 B2
(45) Date of Patent: Nov. 29, 2016

(54) SYSTEMS AND METHODS FOR ASSOCIATING LOCATION INFORMATION WITH A COMMUNICATION SUB-ASSEMBLY HOUSED WITHIN A COMMUNICATION ASSEMBLY

(71) Applicant: ADC Telecommunications, Inc., Shakopee, MN (US)

(72) Inventors: Jonathan T. Lawson, Eagan, MN (US); Joseph C. Coffey, Burnsville, MN (US); John P. Anderson, Eden Prairie, MN (US); Laxman R. Anne, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 290 days.

(21) Appl. No.: 14/138,624

(22) Filed: Dec. 23, 2013

(65) Prior Publication Data

US 2014/0219656 A1    Aug. 7, 2014

Related U.S. Application Data

(60) Provisional application No. 61/760,816, filed on Feb. 5, 2013.

(51) Int. Cl.
| | |
|---|---|
| *G02B 6/44* | (2006.01) |
| *H04B 10/27* | (2013.01) |
| *H04L 12/24* | (2006.01) |
| *H04B 10/80* | (2013.01) |
| *H04L 12/933* | (2013.01) |
| *H04L 29/12* | (2006.01) |

(52) U.S. Cl.
CPC ............. *G02B 6/4452* (2013.01); *H04B 10/27* (2013.01); *H04B 10/801* (2013.01); *H04L 41/12* (2013.01); *H04L 49/15* (2013.01); *H04L 61/2015* (2013.01)

(58) Field of Classification Search
None
See application file for complete search history.

(56) References Cited

U.S. PATENT DOCUMENTS

2003/0227904 A1   12/2003   Rabinovich et al.
2005/0114474 A1   5/2005   Anderson et al.
(Continued)

OTHER PUBLICATIONS

International Searching Authority, "International Search Report and Written Opinion from PCT Application No. PCT/US2013/077532 mailed Apr. 10, 2014", "from PCT Counterpart of U.S. Appl. No. 14/138,624", Apr. 10, 2014, pp. 1-10, Published in: WO.
(Continued)

*Primary Examiner* — Mike Stahl
(74) *Attorney, Agent, or Firm* — Fogg & Powers LLC (57) ABSTRACT

An exemplary optical distribution frame includes a frame structure defining multiple positions into which multiple chassis can be inserted and a frame controller unit attached to the frame structure. The frame structure includes a frame controller and a switch communicatively coupled to the frame controller, wherein the switch includes a multiple ports. The frame structure including multiple cables, each cable being attached to a respective one of the ports of the switch and routed and attached to the optical distribution frame so that each cable can be attached to a chassis inserted into a predetermined one of the positions in the optical distribution frame, wherein the frame controller is configured to communicate port mapping information to a management entity that is communicatively coupled to the frame controller for use by the management entity in associating location information with a chassis inserted into the optical distribution frame.

20 Claims, 2 Drawing Sheets

(56) References Cited

U.S. PATENT DOCUMENTS

| | | | |
|---|---|---|---|
| 2009/0142054 A1* | 6/2009 | Lipski et al. | G02B 6/4452 398/43 |
| 2010/0003000 A1 | 1/2010 | Rapp et al. | |
| 2010/0092171 A1 | 4/2010 | Conner | |
| 2010/0157516 A1 | 6/2010 | Doorhy et al. | |
| 2010/0211664 A1* | 8/2010 | Raza et al. | H01R 13/6658 709/223 |
| 2010/0267274 A1* | 10/2010 | McNally et al. | H04Q 1/136 439/488 |
| 2010/0271961 A1* | 10/2010 | Caveney | H04B 3/548 370/248 |
| 2011/0116748 A1* | 5/2011 | Smrha et al. | G02B 6/4455 385/76 |
| 2011/0149526 A1 | 6/2011 | Turner | |
| 2011/0286154 A1 | 11/2011 | Coffey et al. | |
| 2014/0248028 A1* | 9/2014 | Campbell | G02B 6/4452 385/135 |
| 2015/0030323 A1* | 1/2015 | Lawson et al. | H04Q 11/0067 398/33 |

OTHER PUBLICATIONS

European Patent Office, "Extended European Search Report from EP Application No. 13874433.9", "from Foreign Counterpart to U.S. Appl. No. 14/138,624", Aug. 19, 2016, pp. 1-11, Published in: EP.

* cited by examiner

SYSTEMS AND METHODS FOR ASSOCIATING LOCATION INFORMATION WITH A COMMUNICATION SUB-ASSEMBLY HOUSED WITHIN A COMMUNICATION ASSEMBLY

CROSS-REFERENCE TO RELATED APPLICATIONS

This application claims the benefit of U.S. Provisional Patent Application Ser. No. 61/760,816, filed on Feb. 5, 2013, which is hereby incorporated herein by reference.

BACKGROUND

Telecommunications networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord or cable" cross connects the two together. In other words, a single logical communication link is often implemented using several segments of physical communication media.

Various types of physical layer management (PLM) systems can be used to track connections made at patch panels and other types of equipment used to make connections in communication networks. Generally, such PLM systems include functionality to track what is connected to each port of such equipment, trace connections that are made using such equipment, and provide visual indications to technicians at such equipment (for example, by illuminating an LED that is associated with a patch panel or a port thereof).

One exemplary type of PLM system makes use of an Electrically Erasable Programmable Read-Only Memory (EEPROM) or other storage device that is integrated with or attached to a connector on a cable, fiber, or other segment of communication media. The storage device is used to store information about the connector or cable along with other information. The port (or other connector) into which the associated connector is inserted is configured to read the information stored in the EEPROM or other storage device when the connector is inserted at that port. One example of such technology includes the QUAREO family of products that are commercially available from TE Connectivity.

Another type of PLM system makes use of so-called "ninth wire" technology. Ninth wire technology makes use of special cables that include an extra conductor or signal path (also referred to here as the "ninth wire" conductor or signal path) that is used for determining which port each end of the cables is inserted into. Ninth wire technology can be used with various types of cables, such as, twisted-pair copper cables and optical cables (in the latter case using hybrid optical cables that include one or more copper wires that serve as the ninth wire). One example of ninth wire technology includes the AMPTRAC family of products that are commercially available from TE Connectivity.

Another type of PLM system makes use of radio frequency identification (RFID) tags and readers. With this type of RFID PLM system, an RFID tag is attached to or integrated with a connector on a cable, fiber, or other segment of communication media. The RFID tag is used to store information about the connector or segment of communication media along with other information. The RFID tag can be read after the associated connector is inserted into a corresponding jack or other port using an RFID reader.

PLM systems typically include management software that aggregates the captured information and stores it in one or more databases. One example of such management software is the Infrastructure Configuration Manager (ICM) software that is commercially available from TE Connectivity.

In addition to information about the connections and cabling used to make them, these databases also typically store information about the other equipment used to make the connections. Examples of such equipment include patch panels, distribution frames, and active networking devices such as switches, routers, and gateways. Examples of information that is stored in the database about such equipment include information about the make and model of the equipment and where it is installed in the network.

Typically, information about where such equipment is installed in the network must be manually entered. This is commonly the case even for "intelligent" equipment that can be automatically discovered by the PLM management software and queried for its identification information (for example, serial number and make and model).

For example, in one common usage scenario, a frame is installed in an equipment room or data center of an enterprise or in a central office of a telecommunication service provider. The frame is designed to house multiple sub-assemblies that are used to make connections between cables. One example of such a frame is an optical distribution frame (ODF) into which multiple chassis can be inserted. In this example, each chassis is designed to hold multiple adapter packs on one or more trays that slide in and out of the chassis. Each adapter pack comprises multiple optical adapters, where each of the optical adapters is configured to optically connect an optical cable terminated with an optical connector (such as an LC or SC connector) with another optical cable terminated with a corresponding optical connector.

As noted above, even when the frame includes some type of PLM intelligence that enables the frame to be discovered by PLM management software and queried for identification information associated with that frame (for example, a serial or other identification number and a make and model), location information for that frame typically must be manually entered into the PLM management system (for example, using a Web interface or mobile application). This is because the frame is typically not aware of where it is located. The PLM management system is then able to associate the manually entered location information with the identification information that the PLM management software was able to automatically discover.

Also, whenever a sub-assembly (for example, an optical chassis of the type noted above) is installed in the frame, location information for that sub-assembly must also be manually entered into the PLM management system. The location information for each sub-assembly includes where that sub-assembly is located (for example, a physical location and/or which frame the sub-assembly has been inserted into) as well as which slot or position within the frame that sub-assembly has been inserted into.

The location information for each such sub-assembly typically must be manually entered even if the sub-assembly otherwise includes PLM intelligence that enables it to be discovered and queried by the PLM management software for its identification information. This is because the sub-assembly typically is not aware of where it is located. The need to manually enter location information for the sub-assembly adds an additional manual step to the work-flow associated with installing the sub-assembly, which increases the time required to complete the work flow and which can result in incorrect data being manually entered. Moreover, it is common that when a frame is initially deployed, less than the maximum number of sub-assemblies that could be housed in that frame are actually installed in the frame during the initial deployment. As a result, location information for the various sub-assemblies in a given frame might be manually entered by different people at different times.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Figure 1:
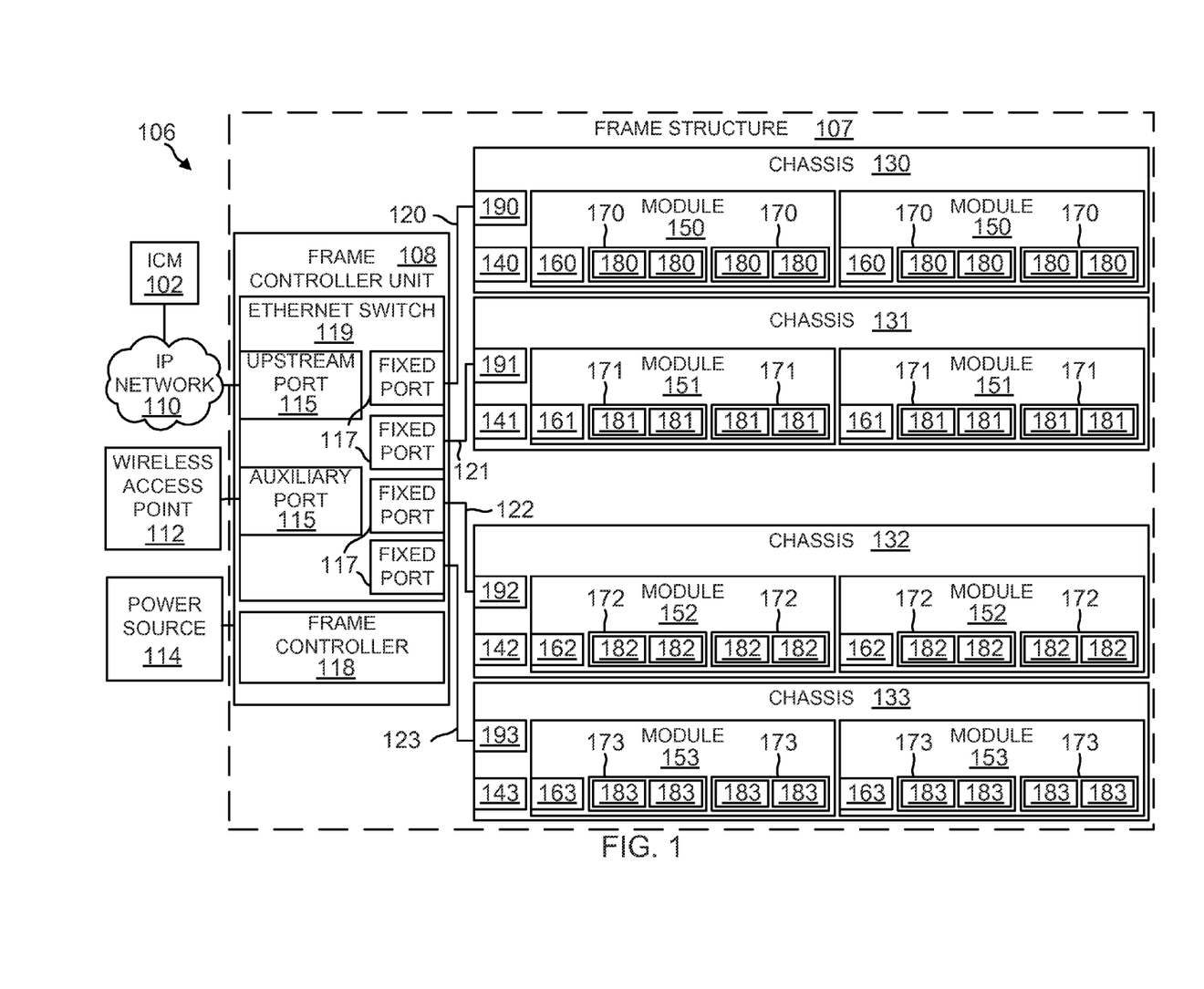
FIG. 1 is a block diagram of an exemplary embodiment of a communication system.

FIG. 1 shows one exemplary embodiment of a system 100 that can be used to automatically associate location information with communication sub-assemblies 130-133 that are inserted into a larger communication assembly 106. The larger communication assembly 106 into which the communication sub-assemblies 130-133 can be inserted is configured to physically hold the sub-assemblies 130-133 in place. The assembly 106 includes a plurality of slots or positions and each of the sub-assemblies 130-133 is inserted into one of the positions in the assembly 106. Each sub-assembly 130-133 is used make connections between various cables (such as fiber optic cables terminated with LC, SC, Multiple-Push-On (MPO) connectors or copper cables such as CAT-5 or CAT-6 twisted-pair cables terminated with RJ-45 connectors).

In the exemplary embodiment described here in connection with FIG. 1, the assembly 106 comprises an optical distribution frame 106 (also referred to here as the "optical distribution frame" 106 or simply the "frame" 106). Also, in this exemplary embodiment, the sub-assemblies 130-133 comprise chassis 130-133 that are configured to hold multiple fiber optic modules 150-153 (for example, in a 4 Rack Unit (RU) sized chassis). The sub-assemblies 130-133 are also referred to here as the "chassis" 130-133. The optical distribution frame 106 comprises a frame structure 107 that is configured to have a plurality of positions, where a chassis 130-133 can be inserted into each of the positions. For ease of explanation, the frame 106 is shown in FIG. 1 as being configured to house up to four chassis 130-133, and each chassis 130-133 is shown as being configured to house up to two fiber optic modules 150-153; however, it is to be understood that the frame 106 can be configured to house any number of chassis 130-133, and each chassis 130-133 can be configured to house any number of fiber optic modules 150-153.

Each optical module 150-153 is implemented as an optical tray that is configured to hold at least one multiple adapter pack 170-173. Each adapter pack 170-173 comprises multiple optical adapters 180-183, where each of the optical adapters 180-183 is configured to optically connect an optical cable (not shown) terminated with an optical connector (such as an LC, SC, or a Multi-fiber Push On (MPO) connector) with another optical cable (not shown) terminated with a corresponding optical connector. Again, for ease of explanation, in FIG. 1, each module 150-153 is shown as holding two adapter packs 170-173, and each adapter pack 170-173 is shown in FIG. 1 as holding up to two adapters 181; however, it is to be understood that each module 150-153 can be configured to hold any number of adapter packs 170-173, and each adapter pack 170-173 can be configured to hold any number of optical adapters 180-183. Also, it is to be understood that the techniques described here can be used for other types of connection devices including, for example, ones where a single cable (or a single cable bundle) is broken out in order to be connected to multiple cables or cable bundles (such as, for example, MPO, splitter, or cassette type devices).

In the exemplary embodiment described herein connection with FIG. 1, each of the connectors includes a respective non-volatile storage device (such as an EEPROM) that is used to gather information about the connector or the cable (for example, identification information for the cable or connector such as serial number or other identifier and make and model). Each module 150-153 includes a respective module controller 160-163. Each module 150-153 and the corresponding adapter packs 170-173 and optical adapters 180-183 are configured so that the module controller 160-163 for that module 150-153 can determine whether a connector is inserted into each optical adapter 180-183 and read the storage device associated with that inserted connector (if there is one). For example, each optical adapter 180-183 include one or more contacts or terminals that come into electrical contact with corresponding contacts or terminals on any connector that is inserted into the adapter 180-183, where such contacts or terminals are used to electrically couple the storage device for that connector to the corresponding module controller 160-163 so that the module controller 160-163 can determine if a connector is inserted into each optical adapter 180-183 and read information from a storage device attached to such a connector (if any). In some applications, the data read from the storage device is used to track connections made at the frame 106. In some applications, connectors that include such storage devices are not used and, instead, connections are tracked by inferring connections using the functionality that determines whether a connector is inserted in each adapter or port. In some applications, a combination of the foregoing approaches is used.

Examples of such chassis 130-133, modules 150-153, adapter packs 170-173, and optical adapters 180-183 are described in the following U.S. Provisional Patent Applications, all of which are filed on the same date as the present application: U.S. Provisional Patent Application Ser. No. 61/761,048, filed on Feb. 5, 2013, titled "Optical Assemblies with Managed Connectivity"; U.S. Provisional Patent Application Ser. No. 61/761,034, filed on Feb. 5, 2013, titled "Optical Assemblies with Managed Connectivity"; U.S. Provisional Patent Application Ser. No. 61/761,042, filed on Feb. 5, 2013, titled "Optical Assemblies with Managed Connectivity"; and U.S. Provisional Patent Application Ser. No. 61/761,009, filed on Feb. 5, 2013, titled "Slidable Telecommunications Tray with Cable Slack Management". All of the preceding applications are incorporated herein by reference.

In the exemplary embodiment shown in FIG. 1, each chassis 130-133 includes a respective master controller 140-143 that is electrically coupled to the module controller 160-163 for each module 150-153 that is included in that chassis 130-133 (for example, using a respective flex circuit interconnect). In this exemplary embodiment, the master controller 140-143 and its associated module controllers 160-163 are configured to use a master-slave scheme for communicating with one another. In such a scheme, the master controller 140-143 serves as the "master," and each of the module controllers 160-163 serves as a "slave." For example, in one implementation of such a scheme, each module controller 160-163 determines when a connector has been inserted into an optical adapter 180-183 associated with that module controller 160-163 and reads information from the storage device attached or otherwise associated with that connector. When prompted to do so by the associated master controller 140-143, each module controller 160-163 informs the master controller 140-143 of any state changes for any of the optical adapters 180-183 associated with that module controller 160-163 (for example, that a connector has been inserted or removed from an optical adapter 180-183) and forwards to the master controller 140-143 information read from storage devices inserted into optical adapters 180-183 associated with that module controller 140-143.

In the exemplary embodiment shown in FIG. 1, each chassis 130-133 includes a at least one management network interface 190-193 that can be used to couple the master controller 140-143 to an IP network 110 that is used for communicating the PLM information described below to a management entity 102. In an example implementation of such an embodiment, the management network interface 190-193 for each chassis 130-133 is implemented using an ETHERNET network interface (and associated RJ-45 port) so that the corresponding master controller 140-143 can be coupled to the IP network 110 using a CAT-5 or CAT-6 twisted-pair copper cable. It is to be understood, however, that the management network interface 190-193 can be implemented in other ways.

It is noted that, for ease of explanation, the IP network 110 is shown using a separate cloud symbol, but it is to be understood that the frame 106, chassis 130-133, and cabling described here can be used to implement a part of the IP network 110 over which the PLM information is communicated. Alternatively, the IP network 110 over which the PLM information is communicated can be kept separate from the network that the frame 106, chassis 130-133, and cabling are a part of.

The management entity 102 is typically implemented as software that runs on a computer that is coupled to the IP network 110. The management entity 102 is configured to receive information pertaining to various devices and media used to implement the physical layer in the network (including, but not limited to, the chassis 130-133 and frame 106 and the cables and connectors that make connections there). The physical layer information (PLI) that is communicated to the management entity 102 includes information about various devices in the network (also referred to here as "device information") as well as information about any segments of physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various segments of physical communication media.

Examples of media information that can be stored in such storage devices include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices. For example, testing, media quality, or performance information can be stored in such storage devices. The testing, media quality, or performance information, for example, can be the results of testing that is performed when a particular segment of media is manufactured or installed.

The information provided to the management entity 102 can also include information that is manually entered (for example, using a Web interface that is implemented by the management entity 102 or a mobile application).

The management entity 102 includes or uses a database or other data store (not shown) for storing the information provided to it. The management entity 102 also includes functionality that provides an interface for external devices or entities to access the physical layer information maintained by the management entity 102. This access can include retrieving information from the management entity 102 as well as supplying information to the management entity 102. In this example, the management entity 102 is implemented as "middleware" that is able to provide such external devices and entities with transparent and convenient access to the information maintained by the management entity 102. Because the management entity 102 aggregates information from the relevant devices in the network and provides external devices and entities with access to such information, the external devices and entities do not need to individually interact with all of the devices in the network that provide information to the management entity 102, nor do such devices need to have the capacity to respond to requests from such external devices and entities.

The management entity 102, in this example, implements an application programming interface (API) by which application-layer functionality can gain access to the physical layer information maintained by the management entity 102 using a software development kit (SDK) that describes and documents the API.

More information about physical layer information and the aggregation point can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

In the exemplary embodiment shown in FIG. 1, the master controller 140-143 in each chassis 130-133 is configured to interact with, monitor, and/or control the operation of the components of the chassis 130-133 (for example, any buttons (or other input components) and any light emitting diodes (LEDs) (or other visual indicators) incorporated into the body of the chassis 130-133 itself) as well as the module controllers 180-183. Also, the master controller 140-143 in each chassis 130-133 is configured to interact with external entities via the IP network 110. For example, each master controller 140-143 is configured to implement appropriate functionality and protocols for the master controller 140-143 to obtain an IP address (for example, a static IP address that is manually assigned to the master controller 140-143 via a Web or mobile app interface that is implemented by the master controller 140-143 or a dynamic IP address that is assigned to the module controller 140-143 via a Dynamic Host control Protocol (DHCP) server for the IP network 110). Also, each master controller 140-143 is configured to implement appropriate functionality and protocols for the master controller 140-143 to be discovered by, and to discover, the management entity 102. This discovery of and by the managing entity 102 can be done manually (for example, by manually providing an address for the master controller 140-143 to the managing entity 102 and by manually providing an address for the managing entity 102 to the master controller 140-143 using, for example, a Web or mobile app interface implemented by the master controller 140-143 and the managing entity 102) or automatically (for example, using a suitable discovery protocol such as the Universal Plug and Play (UPnP) discovery protocol).

In the exemplary embodiment shown in FIG. 1, the frame 106 includes a frame controller unit 108 that is attached to the structure that implements the frame. For example, in one implement of such embodiment, the frame controller unit 108 is attached to the top of such structure. In other implementations, the frame controller unit 108 is located elsewhere in the frame 106 (for example, on the bottom of the frame structure).

In this embodiment, the frame controller unit 108 includes a frame controller 118 and an ETHERNET switch 119. The frame controller 118 is configured to interact with, monitor, and/or control the operation of the components of the frame controller unit 108 (for example, the ETHERNET switch 119 as well as any buttons (or other input components) and any light emitting diodes (LEDs) (or other visual indicators) incorporated into the frame controller unit 108) and the frame 106 (for example, any LEDs that are mounted to the frame 106 itself). Also, the frame controller 118 is configured to interact with external entities via the IP network 110. For example, the frame controller 118 is configured to implement appropriate functionality and protocols for the frame controller 118 to obtain an IP address (for example, a static IP address that is manually assigned to the frame controller 118 via Web or mobile app interface that is implemented by the frame controller 118 or a dynamic IP address that is assigned to the frame controller 118 via a DHCP server for the IP network 110). Also, the frame controller 118 is configured to implement appropriate functionality and protocols for the frame controller 118 to be discovered by, and to discover, the management entity 102. This discovery of and by the managing entity 102 can be done manually (for example, by manually providing an address for the frame controller 118 to the managing entity 102 and by manually providing an address for the managing entity 102 to the frame controller 118 using, for example, a Web or mobile app interface implemented by the frame controller and managing entity 102) or automatically (for example, using a suitable discovery protocol such as the UPnP discovery protocol).

The ETHERNET switch 119 includes two sets of ports 115 and 117. One set of ports 115 are standard ETHERNET ports in which ETHERNET cables can be easily inserted and removed in connection with the normal operation of the frame 106. These ports 115 are also referred to here as "standard ports" 115. In the exemplary embodiment shown in FIG. 1, the ETHERNET switch 119 includes two standard ports 115, one of which is used to connect the ETHERNET switch 119 (and the other devices coupled to the other ports 115 and 117 of the switch 119) to the IP network 110. This standard port 115 is also referred to here as the "upstream port" 115. The other standard port 115 is an auxiliary port 115 that can be used, for example, to couple a wireless access point 112 to the IP network 102 or to daisy chain two or more frames 106 (and there associated frame controllers 118) together (for example, as described further in more detail below).

The ETHERNET switch 119 also includes a second set of ports 117 that are configured so that the ETHERNET cables inserted into those ports 117 cannot be easily removed from the ports 117 in connection with the normal operation of the frame 106. In the following description, these ports 117 are also referred to here as the "fixed ports" 117. This can be done using a suitable connector or attachment mechanism.

For each of the fixed ports 117, an ETHERNET cable 120-123 is inserted into that fixed port 117 that is configured to be inserted into the management network interface 190-193 of a chassis 130-133 that is inserted at one particular position in the frame 106 and is configured so that the cable 120-123 cannot be inserted into the management network interface 190-193 of a chassis 130-133 inserted into any of the other positions in the frame 106. This can be done, for example, by routing and attaching each ETHERNET cable 120-123 to the frame 106 so that there is only enough slack at the chassis end of that ETHERNET cable 120-123 to be able to physically reach the management network interface 190-193 of a chassis 130-133 inserted into only one predetermined chassis position in the frame 106 and not be able to physically reach the management network interfaces 190-193 of chassis 130-133 inserted into the other chassis positions in the frame 106.

In this way, a relationship between each of the fixed ports 117 and a particular chassis position in the frame 106 is maintained. This relationship can be used to associate any chassis 130-133 that is directly coupled to that fixed port 117 with that particular chassis position in that particular frame 106. This relationship can be used to automatically associate location information with a chassis 130-133 inserted into the frame 106. This location information for the chassis 130-133 includes, for example, the location of the frame 106 and the chassis position within the frame 106 that the chassis 130-133 is inserted into. The management entity 102 can do this. Also, this can be done by the frame controller 118.

The frame controller 118 is communicatively coupled to the ETHERNET switch 119 so that it is able to communicate with the managing entity 102 via the IP network 110. Also, as is described in more detail below, the frame controller 118 is configured to retrieve from the ETHERNET switch 119 information that maps each of the ports 115 and 117 of the switch 119 to MAC addresses that can be accessed via that switch port (for example, by retrieving the port map table that is maintained by an automatic translation unit (ATU) or lookup engine in the ETHERNET switch 119).

In exemplary embodiment shown in FIG. 1, power can be supplied to the active components of the chassis 130-133 (and the modules 150-153 included therein) using Power over Ethernet (POE). In this embodiment, the ETHERNET switch 119 is configured to source POE power over the auxiliary port 115 and the 117 and is coupled to a 48 Volt Direct Current (DC) power source 114 in order to do so. This 48V DC power can also be used to power the active components of the frame 106 (including the frame controller unit 108 and any LEDs attached to the frame 106). It is to be understood, however, that power can be supplied in other ways.

The auxiliary port 115 can also be used to connect multiple frames 106 (and the associated frame controller units 108) in a daisy-chain configuration. In such a configuration, the upstream port 115 for a first frame 106 is connected directly to the IP network 110 (that is, is not connected to the IP network 110 through another one of the frames 106). The upstream port 115 of a second one of the frames 106 is connected to the auxiliary port 115 of the first frame 106, the upstream port 115 of a third one of the frames 106 is connected to the auxiliary port 115 of the second frame 106, and so on. The auxiliary port 115 of the last frame 106 in the daisy chain is not used for implementing the daisy chain and can be used for other purposes (for example, for connecting a wireless access point 115 to the IP network 110). The techniques for automatically associating location information with chassis 130-133 inserted into a frame 106 can be used with such a daisy-chain configuration.

Figure 2:
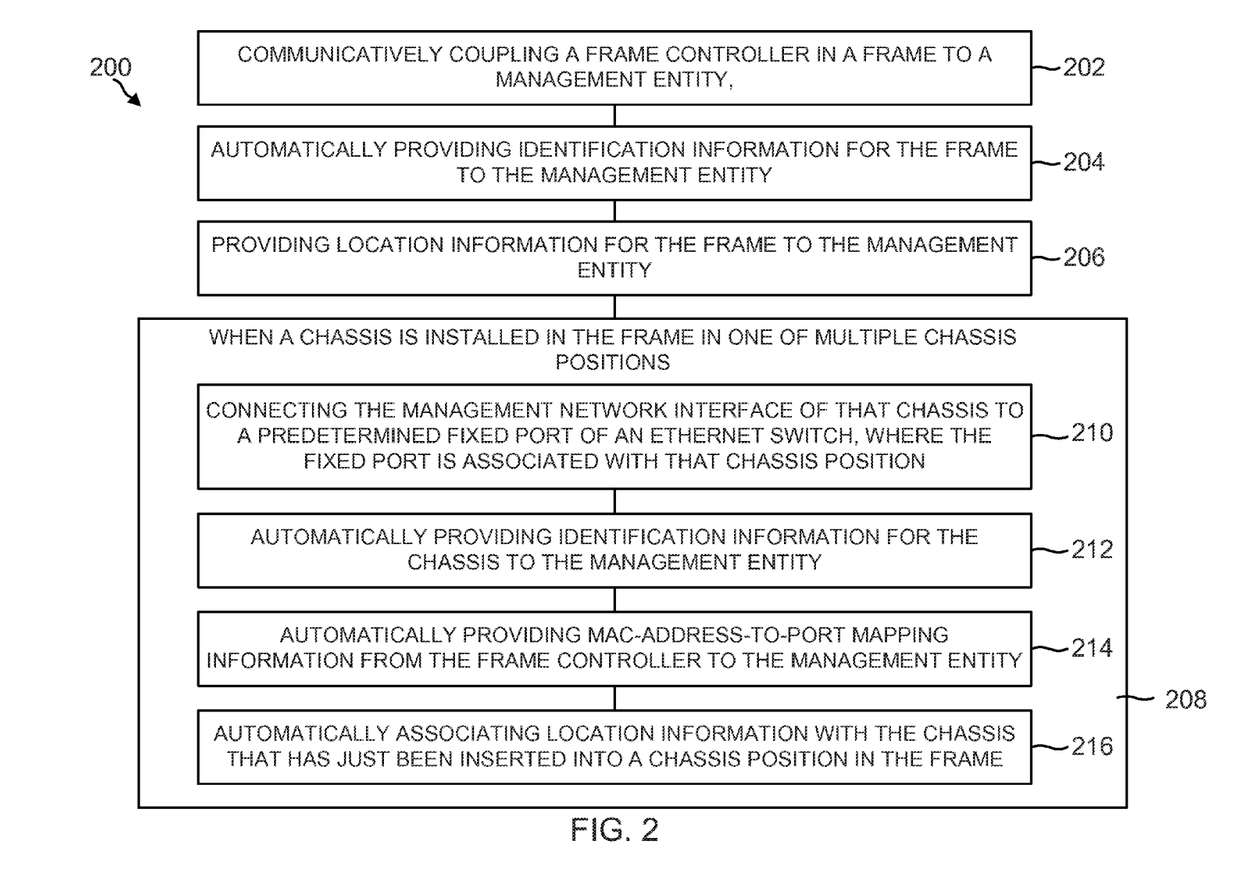
FIG. 2 is a flow diagram of an exemplary embodiment of a method of automatically associating location information with a sub-assembly installed in a frame.

FIG. 2 is a flow diagram of one exemplary embodiment of a method 200 of associating location information with a communication sub-assembly (such as a chassis) that is inserted into a frame (or similar assembly into which multiple communication sub-assemblies can be inserted). The exemplary embodiment shown in FIG. 2 is described here as being implemented using the system 100 shown in FIG. 1, though it is to be understood that other embodiments can be implemented in other ways.

Method 200 comprises communicatively coupling the frame controller 118 in the frame 106 to management entity 102 (block 202). In one common usage scenario, the frame 106 is installed in an equipment room or data center of an enterprise or in a central office of a telecommunication service provider. In this example, the frame controller 118 is connected to the IP network 110 by connecting one of the standard ports 115 of the ETHERNET switch 119 included in the frame controller unit 108 to the IP network 110 using an appropriate cable (for example, a CAT-5 or CAT-6 cable). Then, as described above, the frame controller 118 obtains an IP address (either manually or automatically using, for example, DHCP) and discovers, and is discovered by, the management entity 102 (again, either manually or automatically using UPnP).

Method 200 further comprises automatically providing identification information for the frame 106 to the management entity 102 (block 204). In this example, the management entity 102 automatically obtains identification information for the frame 106 (for example, a serial number and/or another identifier assigned to the frame 106 and/or make and model information for the frame 106) by using the IP network 110 to query the frame controller 118 for such information. Although the identification information is described here as being provided automatically to the management entity 102, it is to be understood that such information could be provided manually. Also, as a part of the information that is provided to the management entity 102, information that identifies which of the fixed ports 117 is associated with which chassis position in the frame 106 is also to be provided to the management entity 102.

Method 200 further comprises providing location information for the frame 106 to the management entity 102 (block 206). In this example, location information for the frame 106 is manually entered and provided to the management entity 102 (for example, using a Web or mobile app interface implemented by the management entity 102). This location information can include, for example, information that specifies a physical location for the frame 106 (for example, GPS coordinates, an address for the building in which the frame 106 is installed, and/or a number or other identifier for the floor, room, and/or row where the frame 106 is installed). This location information can be specified in any suitable away (for example, using absolute and/or relative coordinates or addresses).

Method 200 further comprises, when a chassis 130-133 is installed in the frame 106 in one of the chassis positions (block 208), connecting the management network interface 190-193 of that chassis 130-133 to the predetermined fixed port 117 of the ETHERNET switch 119 that is associated with that chassis position (block 210). In this example, the master controller 140-143 obtains an IP address (either manually or automatically using, for example, DHCP) and discovers, and is discovered by, the management entity 102 (again, either manually or automatically using UPnP).

Method 200 further comprises automatically providing identification information for the chassis 130-133 to the management entity 102 (block 212) in connection with the chassis 130-133 being inserted into the frame 106. In this example, the management entity 102 automatically obtains identification information for the chassis 130-133 (for example, a serial number and/or other identifier assigned to the chassis 130-133 and module 150-153, adapter packs 170-173, and adapters 180-183 housed within the chassis 130-133, and any connectors or cables attached thereto, and/or make and model information for any of the foregoing) by using the IP network 110 to query the master controller 140-143 for that chassis 130-133 for such information. Also, in this example, a media access control (MAC) address associated with the management network interface 190-193 is also communicated to the management entity 102.

Method 200 further comprises automatically providing MAC-address-to-port mapping information from the frame controller 118 to the management entity 102 (block 214). In this example, the frame controller 118 reads the routing tables maintained by the ATU or lookup engine in the switch 119 in order to come up with the MAC-address-to-port mapping information. This MAC-address-to-port mapping information is provided to the management entity 102 via the IP network 110.

Method 200 further comprises automatically associating location information with the chassis 130-133 that has just been inserted into a chassis position in the frame 106 (block 216). In this example, the management entity 102 does this by using the MAC address for the management network interface 190-193 of that chassis 130-133 to determine which frame 106—and which chassis position within that frame 106—the chassis 130-133 is inserted into. The frame 106 that the chassis 130-133 is inserted into is the one whose MAC-address-to-port mapping information includes the MAC address for the management network interface 190-193. Then, the management entity 102 associates the location information for that frame 106 (which was manually entered in connection with block 206) with that chassis 130-133 (and module 150-153, adapter packs 170-173, and adapters 180-183 in that chassis 130-133 and any connectors or cables attached thereto). Also, the management entity 102 determines the chassis position within that frame 106 by using the MAC address for the management network interface 190-193 of that chassis 1301-133 and the MAC-address-to-port mapping information to determine which fixed port 117 that chassis 130-133 is connected to.

In this way, location information can be associated with the chassis 130-133 automatically (that is, without having to manually enter such location information). This eliminates the manual data entry step that would otherwise be needed each time a chassis 130-133 is inserted into the frame 106 and the need for such information to be manually entered by different people at different times, when the frame 106 is initially deployed with less than all of the chassis positions filled with chassis 130-133.

EXAMPLE EMBODIMENTS

Example 1 includes a system comprising: a management entity; a communication assembly configured to receive a plurality of communication sub-assemblies in a plurality of positions, the communication assembly comprises: a controller; and a switch communicatively coupled to the controller, the switch including a plurality of ports; a plurality of cables, each cable being attached to a respective one of the ports of the switch and routed and attached to the communication assembly so that each cable can be attached to a communication sub-assembly inserted into a predetermined one of the positions in the communication assembly; wherein the controller is configured to communicate port mapping information to the management entity; and wherein the management entity is configured to use the port mapping information to associate location information with a communication sub-assembly inserted into the communication assembly.

Example 2 includes the system of Example 1, wherein the communication assembly comprises an optical distribution frame.

Example 3 includes the system of any of Examples 1-2, wherein the sub-assembly comprises a chassis configured to house a plurality of optical modules, each module comprising an optical tray configured to hold at least one adapter pack, wherein each adapter pack comprises multiple optical adapters.

Example 4 includes the system of any of Examples 1-3, wherein when a communication sub-assembly is inserted into a first position of the communication assembly and the predetermined cable associated with the first position is connected to the chassis, a controller included in the chassis is communicatively coupled to the management entity via the switch.

Example 5 includes the system of Example 4, wherein the management entity is configured to automatically query the communication sub-assembly inserted into the communication assembly.

Example 6 includes the system of any of Examples 1-5, wherein the management entity is configured to receive location information associated with the communication assembly, wherein the management entity is configured to use the port mapping information to associate, with the communication sub-assembly inserted into the communication assembly, at least some of the location information associated with the communication assembly.

Example 7 includes the system of any of Examples 1-6, wherein the switch is configured to supply power to each communication sub-assembly inserted into the communication assembly.

Example 8 includes the system of any of Examples 1-7, wherein the switch comprises an ETHERNET switch.

Example 9 includes the system of any of Examples 1-8, wherein the port mapping information comprises information to map media access control (MAC) addresses associated with communication sub-assemblies inserted into the communication assembly to ports of the switch.

Example 10 includes an optical distribution frame comprising: a frame structure defining a plurality of positions into which a plurality of chassis can be inserted; and a frame controller unit attached to the frame structure, the frame structure comprising: a frame controller; and a switch communicatively coupled to the frame controller, wherein the switch includes a plurality of ports; a plurality of cables, each cable being attached to a respective one of the ports of the switch and routed and attached to the optical distribution frame so that each cable can be attached to a chassis inserted into a predetermined one of the positions in the optical distribution frame; wherein the frame controller is configured to communicate port mapping information to a management entity that is communicatively coupled to the frame controller for use by the management entity in associating location information with a chassis inserted into the optical distribution frame.

Example 11 includes the optical distribution frame of Example 10, wherein each chassis is configured to house a plurality of optical modules, each module comprising an optical tray configured to hold at least one adapter pack, wherein each adapter pack comprises multiple optical adapters.

Example 12 includes the optical distribution frame of any of Examples 10-11, wherein when a chassis is inserted into a first position of the optical distribution frame and the predetermined cable associated with the first position is connected to the chassis, a controller included in the chassis is communicatively coupled to the management entity via the switch.

Example 13 includes the optical distribution frame of Example 12, wherein the management entity is configured to automatically query the communication chassis inserted into the optical distribution frame.

Example 14 includes the optical distribution frame of any of Examples 10-13, wherein the switch is configured to supply power to each chassis inserted into the optical distribution frame.

Example 15 includes the optical distribution frame of Example 14, wherein the switch is configured to supply power to each chassis inserted into the optical distribution frame using Power-over-Ethernet (POE).

Example 16 includes the optical distribution frame of any of Examples 10-15, wherein the port mapping information comprises information to map media access control (MAC) addresses associated with chassis inserted into the optical distribution frame to ports of the switch.

Example 17 includes the optical distribution frame of any of Examples 10-16, wherein the switch comprises an ETHERNET switch.

Example 18 includes a method comprising: communicatively coupling a frame controller in an optical distribution frame to a management entity via a network, wherein the optical distribution frame comprises: a plurality of positions into which a plurality of chassis can be inserted; and a frame controller unit comprising: a frame controller; and a switch communicatively coupled to the frame controller, wherein the switch including a plurality of ports; a plurality of cables, each cable being attached to a respective one of the ports of the switch and routed and attached to the optical distribution frame so that each cable can be attached to a chassis inserted into a predetermined one of the positions in the optical distribution frame; providing location information for the optical distribution frame to the management entity; when a chassis is installed in the optical distribution frame in one of the chassis positions: connecting a management network interface of that chassis to the predetermined port of the switch that is associated with that chassis position; automatically providing identification information for the chassis to the management entity; automatically providing MAC-address-to-port mapping information from the frame controller to the management entity; and automatically associating location information with the chassis that has just been inserted into the chassis position in the optical distribution frame.

Example 19 includes the method of Example 18, further comprising: automatically providing identification information for the optical distribution frame to the management entity.

Example 20 includes the method of any of Examples 18-19, wherein providing location information for the optical distribution frame to the management entity comprises manually providing location information for the optical distribution frame to the management entity.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. A system comprising:
   a management entity;
   a communication assembly configured to receive a plurality of communication sub-assemblies in a plurality of positions, the communication assembly comprising:
   a controller; and
   a switch communicatively coupled to the controller, the switch including a plurality of ports;
   a plurality of cables, each cable being attached to a respective one of the ports of the switch and routed and attached to the communication assembly so that each cable can be attached to a communication sub-assembly inserted into a predetermined one of the positions in the communication assembly, wherein each port of the switch is associated with a particular location;
   wherein the controller is configured to communicate port mapping information to the management entity; and
   wherein the management entity is configured to use the port mapping information to associate location information with a communication sub-assembly inserted into the communication assembly.

2. The system of claim 1, wherein the communication assembly comprises an optical distribution frame.

3. The system of claim 1, wherein each communication sub-assembly in the plurality of communication sub-assemblies comprises a chassis configured to house a plurality of optical modules, each module comprising an optical tray configured to hold at least one adapter pack, wherein each adapter pack comprises multiple optical adapters.

4. The system of claim 3, wherein when a communication sub-assembly is inserted into a first position of the communication assembly and the cable predetermined to be associated with the first position is connected to the chassis, a controller included in the chassis is communicatively coupled to the management entity via the switch.

5. The system of claim 4, wherein the management entity is configured to automatically query the communication sub-assembly inserted into the communication assembly.

6. The system of claim 1, wherein the management entity is configured to receive location information associated with the communication assembly, wherein the management entity is configured to use the port mapping information to associate, with the communication sub-assembly inserted into the communication assembly, at least some of the location information associated with the communication assembly.

7. The system of claim 1, wherein the switch is configured to supply power to each communication sub-assembly inserted into the communication assembly.

8. The system of claim 1, wherein the switch comprises an ETHERNET switch.

9. The system of claim 1, wherein the port mapping information comprises information to map media access control (MAC) addresses associated with communication sub-assemblies inserted into the communication assembly to ports of the switch.

10. An optical distribution frame comprising:
    a frame structure defining a plurality of positions into which a plurality of chassis can be inserted; and
    a frame controller unit attached to the frame structure, the frame structure comprising:
    a frame controller; and
    a switch communicatively coupled to the frame controller, wherein the switch includes a plurality of ports;
    a plurality of cables, each cable being attached to a respective one of the ports of the switch and routed and attached to the optical distribution frame so that each cable can be attached to a chassis inserted into a predetermined one of the positions in the optical distribution frame, wherein each port of the switch is associated with a particular location;
    wherein the frame controller is configured to communicate port mapping information to a management entity that is communicatively coupled to the frame controller for use by the management entity in associating location information with a chassis inserted into the optical distribution frame.

11. The optical distribution frame of claim 10, wherein each chassis is configured to house a plurality of optical modules, each module comprising an optical tray configured to hold at least one adapter pack, wherein each adapter pack comprises multiple optical adapters.

12. The optical distribution frame of claim 10, wherein when a chassis is inserted into a first position of the optical distribution frame and the cable predetermined to be associated with the first position is connected to the chassis, a controller included in the chassis is communicatively coupled to the management entity via the switch.

13. The optical distribution frame of claim 12, wherein the management entity is configured to automatically query the chassis inserted into the optical distribution frame.

14. The optical distribution frame of claim 10, wherein the switch is configured to supply power to each chassis inserted into the optical distribution frame.

15. The optical distribution frame of claim 14, wherein the switch is configured to supply power to each chassis inserted into the optical distribution frame using Power-over-Ethernet (POE).

16. The optical distribution frame of claim 10, wherein the port mapping information comprises information to map media access control (MAC) addresses associated with chassis inserted into the optical distribution frame to ports of the switch.

17. The optical distribution frame of claim 10, wherein the switch comprises an ETHERNET switch.

18. A method comprising:
communicatively coupling a frame controller in an optical distribution frame to a management entity via a network, wherein the optical distribution frame comprises:
a plurality of positions into which a plurality of chassis can be inserted; and
a frame controller unit comprising:
a frame controller; and
a switch communicatively coupled to the frame controller, wherein the switch includes a plurality of ports;
a plurality of cables, each cable being attached to a respective one of the ports of the switch and routed and attached to the optical distribution frame so that each cable can be attached to a chassis inserted into a predetermined one of the positions in the optical distribution frame, wherein each port of the switch is associated with a particular location;
providing location information for the optical distribution frame to the management entity;
when a chassis is installed in the optical distribution frame in one of the chassis positions:
connecting a management network interface of that chassis to the predetermined port of the switch that is associated with that chassis position;
automatically providing identification information for the chassis to the management entity;
automatically providing MAC-address-to-port mapping information from the frame controller to the management entity; and
automatically associating location information with the chassis that has just been inserted into the chassis position in the optical distribution frame.

19. The method of claim 18, further comprising: automatically providing identification information for the optical distribution frame to the management entity.

20. The method of claim 18, wherein providing location information for the optical distribution frame to the management entity comprises manually providing location information for the optical distribution frame to the management entity.

* * * * *